May 30, 1939.  R. WEICHARDT ET AL  2,160,449
APPARATUS FOR THE STARTING AND LANDING OF AIRCRAFT
Filed June 5, 1936  3 Sheets-Sheet 1
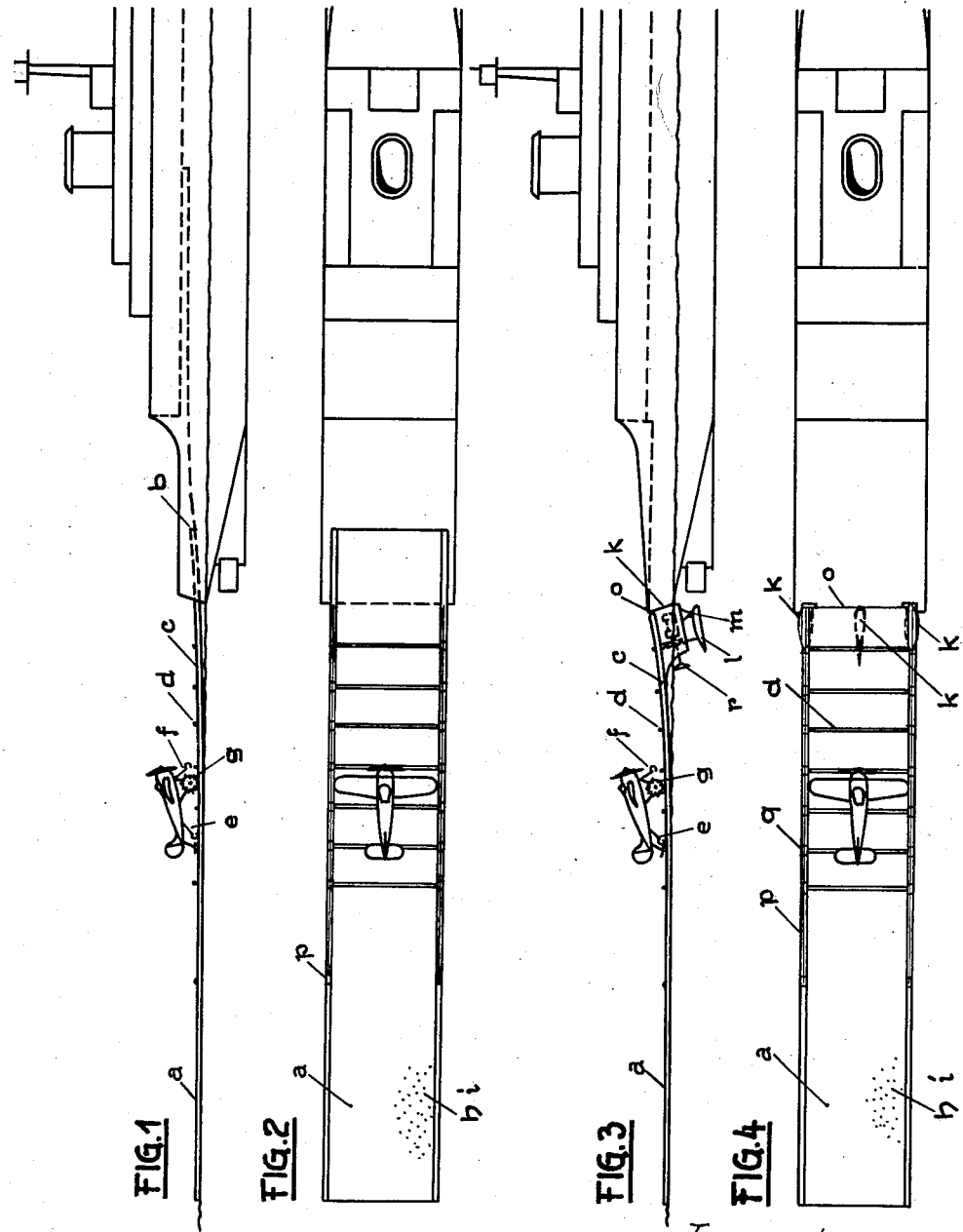
Inventors:
Rudolf Weichardt,
Willy Freistadt and
Johannes Hicke
By Emil Bomelyche
Attorney May 30, 1939.  R. WEICHARDT ET AL  2,160,449
APPARATUS FOR THE STARTING AND LANDING OF AIRCRAFT
Filed June 5, 1936  3 Sheets-Sheet 2
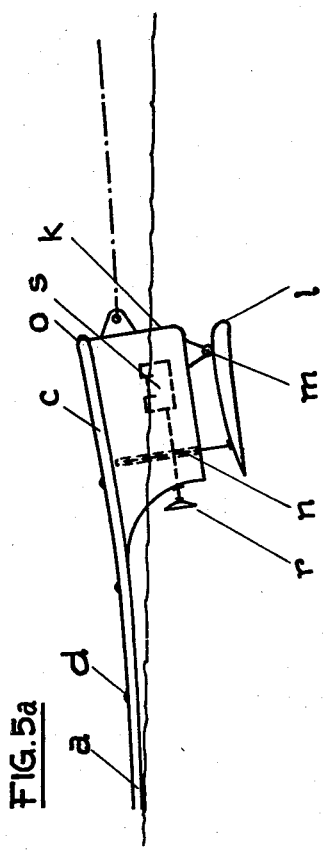
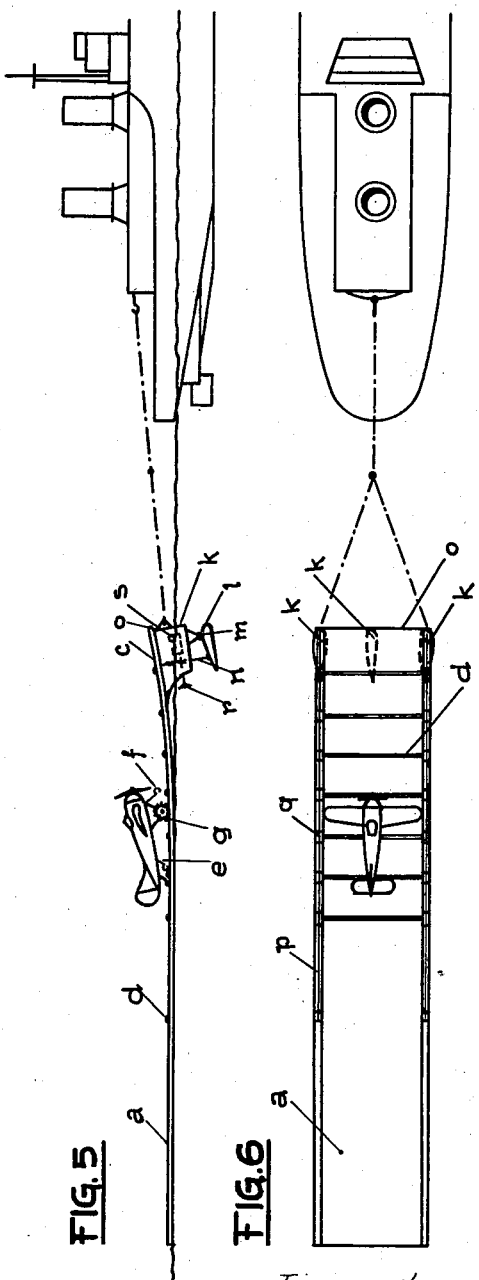
Inventors:
Rudolf Weichardt,
Willy Freistadt and
Johannes Hicke
By Emil Bönnelyche
Attorney

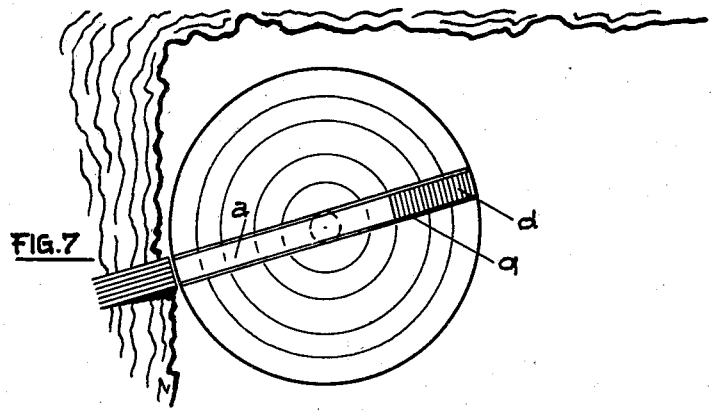
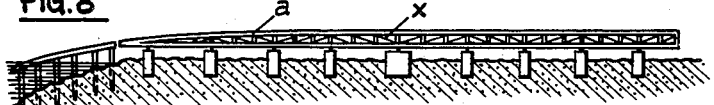
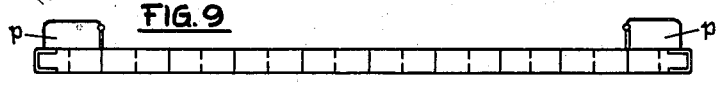
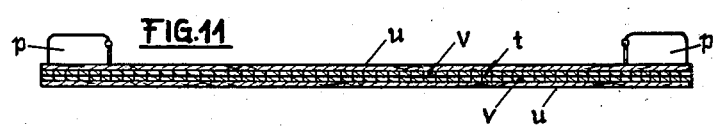
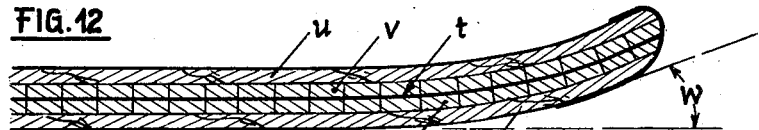
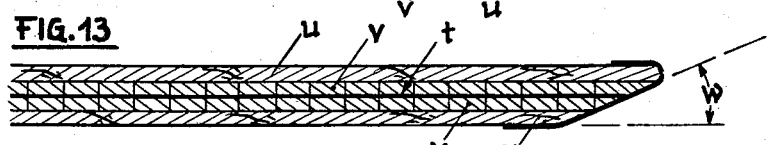

Patented May 30, 1939

2,160,449

UNITED STATES PATENT OFFICE 2,160,449

APPARATUS FOR THE STARTING AND LANDING OF AIRCRAFT

Rudolf Weichardt and Willy Freistadt, Bremen, and Johannes Hicke, Altona-Rissen, Germany, assignors to Krafft & Weichardt, Bremen, Germany, a corporation of Germany Application June 5, 1936, Serial No. 83,788
In Germany February 20, 1936

9 Claims. (Cl. 114—43.5)

Floating aircraft carriers designed for the reception of land aircraft must be provided with a landing deck of such length that the aircraft have sufficient runway in starting and landing. Owing to the direct landing on the landing deck, the aircraft are relatively independent of the condition of the sea during landing since they do not come into contact with the water at all. But the landing deck involves a large ship, large engine power and therefore high cost of building. Further the landing deck aircraft carrier provides a good target to attack from the air (aircraft bombs) from the surface of the water (enemy artillery) and from under the water (submarines).

It is known to provide self-supporting ramps at the stern of a ship, which are foldable or slidable in and out, which reach down to the water surface, and are intended to permit running on of water aircraft. Such self-supporting ramps suspended from the ship, are however too short and too steep for land aircraft. They do not afford the land aircraft sufficient runway.

With the present invention a starting and landing device for land aircraft, that is for all aircraft which can land on solid ground, is provided on sea within a limited compass, by a floating and self supporting platform. It is made rigid to such a degree that upon landing of the aircraft it does not permit local sinking at any point, and may be made of steel or other material as a hollow body of small depth in such a way that it floats with safety when not being towed. The depth of the landing platform is so designed that it bridges the local motion of the sea and the propeller backwash, but elastically follows a running swell.

A further constructional form of the platform is made solid as follows: the platform is provided at its neutral plane, that is at the plane which during bending undergoes neither tensile nor compressive stresses, with a core plate of steel or the like tough, tenacious material. On both sides of this plate elastic or yielding longitudinal or transverse layers of wood, cork or similar buoyant material are provided. By this arrangement of the core plate at the neutral plane damage to the platform cannot be caused by tensile stresses and bending when towed by a ship, during hauling into the ship or similar incidents of operation. The layers of low specific gravity on both sides of the core plate ensure the buoyancy of the platform in every case. Further these layers act to damp vibration owing to their inertia.

The platform is provided with known cross-stretched spring or yielding ropes as braking and catching devices for the aircraft. Laterally arranged protection spaces serve as a protection for the crew and against impact of the sea. They may be used at the same time for the accommodation of braking devices.

In detail the landing platform is designed and constructed with the following ends in view:

It is to be used at the stern of an aircraft carrier as a starting and landing surface which can be run in and out. In the operating position it is run so far in the water that it still lies with its front portion safely on the after deck of the ship. When the platform is not in use, it is accommodated in a niche within the hull of the ship. By the use of the starting and landing platform, the size of an aircraft carrier can be reduced to the size necessary for the accommodation of the aircraft.

When in use as a starting and landing surface the platform is either suspended directly or closely at the stern of a ship or towed at a desired distance therefrom.

To avoid diving of the freely towed platform, the front part thereof is provided with upthrust devices. The upthrust will be obtained dynamically by one or more carrying-vane-like surfaces with variable incidence, and statically by the volume of the watertight carrying deck and its supports. The carrying surfaces and their supports are made hollow and of streamline form. To avoid diving of the platform at low speed, its front edge is bevelled downward or the front part of the platform carried upwards, so that it always glides on the water. Dynamic upthrust by supporting surfaces has the advantage that by altering the angle of incidence of the supporting surfaces the front part of the platform during towing can be raised or lowered according to need in landing and starting. Through the upthrust devices it is possible for battle or special ships to take a landing deck in tow when putting out, but simply to leave it floating upon an enemy attack. The self-supporting floating landing deck owing to its independence of a travelling vessel then affords a landing place for aircraft engaged in the battle when they run out of operating material, at a sufficient distance from the place of battle. For this purpose it is necessary to turn the platform with its front part always in the wind.

Further, it is advantageous for manoeuvring in harbour if the platform can be moved under its own power. By incorporation of a source of power in the supports of the landing deck and driving mechanism in these or the carrying deck, it is made possible to turn the platform into the wind and to move it in harbour by its own power. The source of power at the same time delivers the requisite energy for the braking devices.

The platform with its complete braking and stopping devices mounted upon a carrier turnable into any wind direction will find use on land as a starting and landing device, for instruction and exercise.

The accompanying drawings show some examples embodying the invention.

Figures 1 and 2 show the platform as a starting and landing surface which can be run in and out at the stern of an aircraft carrier, in side view and plan.

Figures 3 and 4 show also in side view and plan the platform with a forward upthrust device, as a starting and landing surface in tow of a battle or special ship, suspended hinge fashion and slippable at the stern.

Figures 5 and 6 show in side view and plan the platform as a starting and landing surface which is towed by a desired vessel by long lines.

Figure 5a is a side view of a portion of Fig. 5 on an enlarged scale.

Figures 7 and 8 are plan and elevational views respectively of a starting and landing ramp.

Figure 9 is a cross-sectional view of a platform.

Figures 10 and 11 are cross-sectional views of modified forms of the platform.

Figures 12 and 13 are longitudinal sectional views showing front edge constructions of the platform.

In these illustrations the platform is designated by $a$. By the raising of the front part of the platform by means of upthrust devices or by carrying the same up on to the deck $b$ of an aircraft carrier the landing surface forms an inclined plane $c$ which destroys the remaining kinetic energy of the landing aircraft and thus provides security against the aircraft running over the front edge $o$ of the landing surface. For example cross stretched spring or yielding ropes $d$ which are actuated by stretching devices $q$ standing on the open platform or in a protection space $p$ for servicing, serve as braking and catching devices. The aircraft on landing is braked against forward movement on these ropes $d$, for example with the aid of catching hooks $e$. Further at high speed of the ship the ropes $d$ with the aid of the catching hooks $f$ and the catching hooks $g$ on the braked wheels, serve to secure the aircraft against running backwards. Where steel is used as the constructional material welded ribs $h$, and where a soft constructional moterial is used for example wood, corresponding arranged material $i$ or similar frictional hold ensuring materials serve to hinder slipping of the aircraft wheels in starting, landing and towing on the platform.

The freely towed platform receives in the forward part a dynamic upthrust through the adjustable lifting surfaces $l$, and a static upthrust by the volume of the lifting surfaces $l$ and the supports $k$. The adjusting device $n$ serves to vary the angle of incidence by rotation about the point $m$. Motors $s$ are provided as power plant, and propellers $r$ for the propulsion of the platform, see Figure 5a.

Figures 7 and 8 show a starting and landing ramp $a$ with its braking devices $d$ and $q$, located on land on a carrier $x$ turnable about a vertical axis into any direction.

Figure 9 shows a platform constructed as a hollow body of metal.

Figures 10 and 11 show a platform with a core plate $t$ of steel. On both sides of the core plate lie longitudinal layers $u$ and transverse layers $v$ of wood, cork or similar buoyant material. The methods of construction of Figures 10 and 11 permit large movements in a running sea without danger of breakage.

Figure 12 shows the carrying up of the front part of the platform $a$ with angle of incidence $w$ to the surface of the water.

Figure 13 shows the bevelling of the front edge of the platform with angle of incidence $w$ to the surface of the water. These formations at the front edge will secure the platform against diving in the water.

What we claim is:

1. A starting and landing surface for aircraft adapted to be towed on the water or carried by a ship, comprising a platform having a central core of tenacious material and top and bottom layers of elastic material running in longitudinal and transverse directions of the platform to form a relatively shallow and buoyant unitary body which is sufficiently rigid in both said directions to resist deformation due to sea and aircraft impacts but sufficiently elastic to accommodate sea swells.

2. A starting and landing surface according to claim 1, in which the core consists of metal to form a hollow body.

3. A starting and landing surface according to claim 1, in which said core consists of a steel plate and the layers of wood on both sides of the plate to form the deck.

4. A starting and landing surface according to claim 1, in which the said core consists of a steel plate, and the layers of a plurality of wood planks arranged transversely relative to the length of the platform and secured on each side of the plate to form layers, and a plurality of wood planks arranged longitudinally relative to the length of the platform and secured on each of the layers of transverse planks to form the outer layers of the platform.

5. A starting and landing surface according to claim 1, in which the front end of the platform is constructed to curve upwardly permanently to prevent the platform from diving into the water when the platform is being towed.

6. A starting and landing surface according to claim 1, in which the front end of the platform has a surface permanently inclined at an angle to the horizontal to prevent the platform from diving into the water when the platform is being towed.

7. In a starting and landing surface according to claim 1, an upthrust device having a buoyant surface attached to the front end of the platform.

8. In a starting and landing surface according to claim 1, an upthrust device at the front end of the platform, comprising a buoyant adjustable lifting surface and a motor and propeller for advancing the platform on the water.

9. In a buoyant, trailing platform for landing and starting land aircraft at sea, comprising a flat structure of slight uniform depth and having sufficient length-wise and cross-wise rigidity to avoid local deformation; a plurality of rope-like brake devices stretched cross-wise on the surface of the platform and adapted for engagement with the ground gripping structure of the aircraft, and a buoyant lifting surface with a built-in motor for self propulsion of the platform attached under the forward end thereof.

RUDOLF WEICHARDT.
WILLY FREISTADT.
JOHANNES HICKE.